(12) United States Patent
Takenouchi

(10) Patent No.: US 10,157,182 B2
(45) Date of Patent: Dec. 18, 2018

(54) INFORMATION PROCESSING APPARATUS AND METHOD OF CONTROLLING THE SAME

(71) Applicant: CANON KABUSHIKI KAISHA, Tokyo (JP)

(72) Inventor: Takuya Takenouchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 15/218,214

(22) Filed: Jul. 25, 2016

(65) Prior Publication Data

US 2017/0040003 A1 Feb. 9, 2017

(30) Foreign Application Priority Data

Aug. 7, 2015 (JP) ................. 2015-157509

(51) Int. Cl.
*G06F 17/30* (2006.01)
*G09G 5/14* (2006.01)
(Continued)

(52) U.S. Cl.
CPC ........ *G06F 17/30056* (2013.01); *G06T 11/60* (2013.01); *G09G 5/00* (2013.01); *G09G 5/14* (2013.01); *G09G 5/37* (2013.01); *G09G 5/38* (2013.01); *G06F 3/1208* (2013.01); *G06F 17/212* (2013.01); *G06K 9/00228* (2013.01); *G06T 11/00* (2013.01); *G09G 2340/045* (2013.01); *G09G 2340/0407* (2013.01); *G09G 2340/0464* (2013.01); *G09G 2340/0492* (2013.01); *G09G 2340/10* (2013.01); *G09G 2340/12* (2013.01); *G09G 2380/16* (2013.01)

(58) Field of Classification Search
CPC ....... G09G 2340/04; G09G 2340/0407; G09G 2340/045; G09G 2340/0464; G09G 2340/12; G09G 2340/10; G09G 2380/16; G06K 9/00221; G06K 9/00228; G06T 11/00; G06F 17/212; G06F 3/1208; G06F 17/30056
See application file for complete search history.

(56) References Cited

U.S. PATENT DOCUMENTS

2004/0054659 A1* 3/2004 McIntyre .......... G06F 17/30247
2004/0161224 A1* 8/2004 Yamazoe ............ G06F 17/3028
386/252

(Continued)

FOREIGN PATENT DOCUMENTS

JP 2003-032470 A 1/2003

*Primary Examiner* — Michelle L Sams
(74) *Attorney, Agent, or Firm* — Venable LLP

(57) ABSTRACT

A setting unit of an apparatus sets, for an image represented by an image file, an area to be displayed in an electronic photo album and stores information representing the set area. A laying out unit of the apparatus determines whether a slot of interest in the page of interest is a slot has a predetermined property. If the slot of interest has the predetermined property, the laying out unit locates, in the slot of interest, an image assigned to the slot of interest without using the stored information set by the setting unit. If the slot of interest does not have the predetermined property, the laying out unit locates, in the slot of interest, a partial image corresponding to the area represented by the information out of the image assigned to the slot of interest.

20 Claims, 19 Drawing Sheets

(51) Int. Cl.
    *G09G 5/37*     (2006.01)
    *G09G 5/38*     (2006.01)
    *G09G 5/00*     (2006.01)
    *G06T 11/60*     (2006.01)
    *G06F 17/21*     (2006.01)
    *G06F 3/12*     (2006.01)
    *G06K 9/00*     (2006.01)
    *G06T 11/00*     (2006.01)

(56) References Cited

U.S. PATENT DOCUMENTS

| | | | |
|---|---|---|---|
| 2006/0190808 A1* | 8/2006 | Balthaser | B63B 13/00 |
| | | | 715/234 |
| 2014/0092424 A1* | 4/2014 | Grosz | G06F 3/1242 |
| | | | 358/1.15 |
| 2014/0193047 A1* | 7/2014 | Grosz | G06F 3/1242 |
| | | | 382/118 |

* cited by examiner

FIG. 5
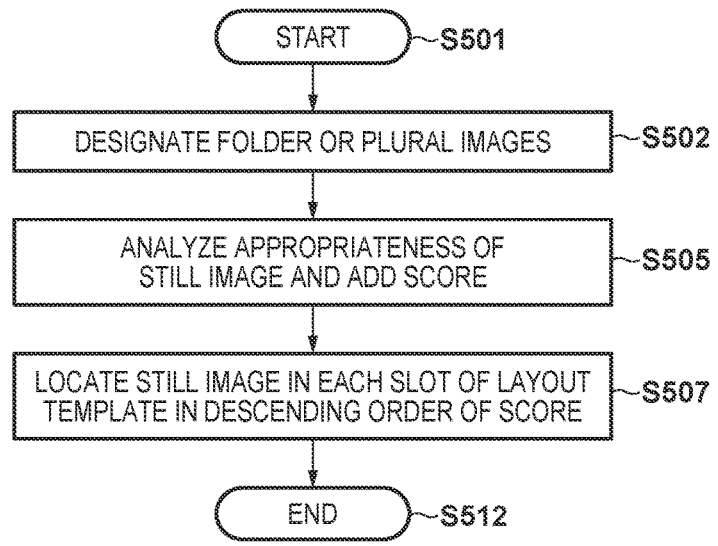
FIG. 6
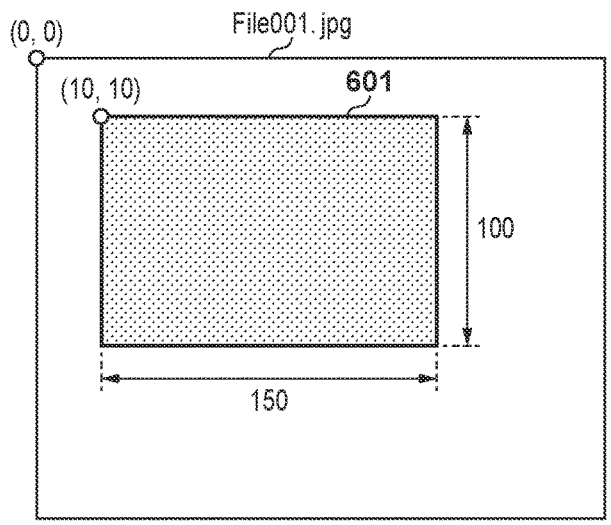
FIG. 7
| Slot | Background |
|---|---|
| K-B-G4-1 | TRUE |
| K-B-G4-2 | FALSE |
| K-B-G4-3 | FALSE |
| K-B-G4-4 | FALSE |

F I G. 8

| File | Trimming | | | |
|---|---|---|---|---|
| | Point [cm] | Width [cm] | Height [cm] | Rotation [degrees] |
| File001.jpg | (10, 10) | 100 | 100 | 0 |
| File002.jpg | (0, 0) | 100 | 100 | 0 |
| File003.jpg | (0, 0) | 100 | 100 | 0 |
| File004.jpg | (0, 0) | 100 | 100 | 0 |
| File005.jpg | (0, 0) | 100 | 100 | 0 |
| File006.jpg | (0, 0) | 100 | 100 | 0 |
| File007.jpg | (0, 0) | 100 | 100 | 0 |
| File008.jpg | (0, 0) | 100 | 100 | 0 |
| File009.jpg | (0, 0) | 100 | 100 | 0 |
| File010.jpg | (0, 0) | 100 | 100 | 0 |
| File011.jpg | (0, 0) | 100 | 100 | 0 |
| File012.jpg | (0, 0) | 100 | 100 | 0 |
| File013.jpg | (0, 0) | 100 | 100 | 0 |
| File014.jpg | (0, 0) | 100 | 100 | 0 |
| File015.jpg | (0, 0) | 100 | 100 | 0 |
| File016.jpg | (0, 0) | 100 | 100 | 0 |
| File017.jpg | (0, 0) | 100 | 100 | 0 |
| File018.jpg | (0, 0) | 100 | 100 | 0 |
| File019.jpg | (0, 0) | 100 | 100 | 0 |
| File020.jpg | (0, 0) | 100 | 100 | 0 |
| File021.jpg | (0, 0) | 100 | 100 | 0 |
| File022.jpg | (0, 0) | 100 | 100 | 0 |
| File023.jpg | (0, 0) | 100 | 100 | 0 |
| File024.jpg | (0, 0) | 100 | 100 | 0 |
| File025.jpg | (0, 0) | 100 | 100 | 0 |

FIG. 10A

| Type-K Page: Front | Type-K Page: 1 | Type-K Page: 2 | ... | Type-K Page: 19 | Type-K Page: 20 | Type-K Page: Back |
|---|---|---|---|---|---|---|
| 1001 | 1002 | | | 1003 | | 1004 |

FIG. 10B

| Type-M Page: Front | Type-M Page: 1 | Type-M Page: 2 | ... | Type-M Page: 49 | Type-M Page: 50 | Type-M Page: Back |
|---|---|---|---|---|---|---|
| 1011 | 1012 | | | 1013 | | 1014 |

F I G. 13A

| Album Type | Group | Page | Slot | File | Trimming Point [cm] | Width [cm] | Height [cm] | Rotation [degrees] |
|---|---|---|---|---|---|---|---|---|
| K | G2 | 2 | 1 | File001.jpg | (10, 10) | 150 | 100 | 0 |
| K | G2 | 2 | 2 | File002.jpg | (0, 0) | 100 | 100 | 0 |
| K | G2 | 2 | 3 | File003.jpg | (0, 0) | 100 | 100 | 0 |
| K | G2 | 2 | 4 | File004.jpg | (0, 0) | 100 | 100 | 0 |

131

F I G. 13B

| Album Type | Group | Page | Slot | File | Trimming Point [cm] | Width [cm] | Height [cm] | Rotation [degrees] |
|---|---|---|---|---|---|---|---|---|
| K | G2 | 2 | 1 | File005.jpg | (0, 0) | 100 | 100 | 0 |
| K | G2 | 2 | 2 | File006.jpg | (0, 0) | 100 | 100 | 0 |
| K | G2 | 2 | 3 | File007.jpg | (0, 0) | 100 | 100 | 0 |
| K | G2 | 2 | 4 | File008.jpg | (0, 0) | 100 | 100 | 0 |

FIG. 13C

| Album Type | Group | Page | Slot | File | Trimming Point [cm] | Trimming Width [cm] | Trimming Height [cm] | Rotation [degrees] |
|---|---|---|---|---|---|---|---|---|
| K | G5 | 5 | 1 | File009.jpg | (0,0) | 100 | 100 | 0 |
| K | G5 | 5 | 2 | File0010.jpg | (0,0) | 100 | 100 | 0 |
| K | G5 | 5 | 3 | File0011.jpg | (0,0) | 100 | 100 | 0 |
| K | G5 | 5 | 4 | File0012.jpg | (0,0) | 100 | 100 | 0 |
| K | G5 | 5 | 5 | File0013.jpg | (0,0) | 100 | 100 | 0 |

FIG. 13D

| Album Type | Group | Page | Slot | File | Trimming Point [cm] | Trimming Width [cm] | Trimming Height [cm] | Rotation [degrees] |
|---|---|---|---|---|---|---|---|---|
| K | G5 | 5 | 1 | File0014.jpg | (0,0) | 100 | 100 | 0 |
| K | G5 | 5 | 2 | File0015.jpg | (0,0) | 100 | 100 | 0 |
| K | G5 | 5 | 3 | File0016.jpg | (0,0) | 100 | 100 | 0 |
| K | G5 | 5 | 4 | File0017.jpg | (0,0) | 100 | 100 | 0 |
| K | G5 | 5 | 5 | File0018.jpg | (0,0) | 100 | 100 | 0 |

FIG. 13E

| Album Type | Group | Page | Slot | File | Trimming Point [cm] | Trimming Width [cm] | Trimming Height [cm] | Rotation [degrees] |
|---|---|---|---|---|---|---|---|---|
| K | G8 | 15, 16 | 1 | File0019.jpg | (0,0) | 100 | 100 | 0 |
| K | G8 | 16 | 2 | File0020.jpg | (0,0) | 100 | 100 | 0 |
| K | G8 | 15 | 3 | File0021.jpg | (0,0) | 100 | 100 | 0 |
| K | G8 | 15 | 4 | File0022.jpg | (0,0) | 100 | 100 | 0 |
| K | G8 | 15, 16 | 5 | File0023.jpg | (0,0) | 100 | 100 | 0 |
| K | G8 | 16 | 6 | File0024.jpg | (0,0) | 100 | 100 | 0 |
| K | G8 | 16 | 7 | File0025.jpg | (0,0) | 100 | 100 | 0 |

F I G. 14

| File | Elements | | | | | Score |
| --- | --- | --- | --- | --- | --- | --- |
| | Color | Contrast | Brightness | Focus | Composition | |
| File001.jpg | 9 | 8 | 9 | 10 | 9 | 9 |
| File002.jpg | 7 | 8 | 8 | 9 | 8 | 8 |
| File003.jpg | 7 | 7 | 7 | 7 | 7 | 7 |
| File004.jpg | 5 | 6 | 5 | 4 | 5 | 5 |
| File005.jpg | 5 | 5 | 5 | 5 | 5 | 5 |
| File006.jpg | 5 | 3 | 4 | 4 | 4 | 4 |
| File007.jpg | 4 | 4 | 4 | 4 | 4 | 4 |
| File008.jpg | 3 | 3 | 3 | 3 | 3 | 3 |
| File009.jpg | 2 | 3 | 2 | 1 | 2 | 2 |
| File010.jpg | 1 | 1 | 1 | 1 | 1 | 1 |
| File011.jpg | 5 | 5 | 5 | 5 | 5 | 5 |
| File012.jpg | 5 | 5 | 3 | 3 | 4 | 4 |
| File013.jpg | 3 | 5 | 3 | 5 | 4 | 4 |
| File014.jpg | 3 | 2 | 4 | 3 | 3 | 3 |
| File015.jpg | 3 | 3 | 3 | 3 | 3 | 3 |
| File016.jpg | 2 | 2 | 2 | 2 | 2 | 2 |
| File017.jpg | 1 | 3 | 1 | 2 | 3 | 2 |
| File018.jpg | 1 | 1 | 1 | 1 | 1 | 1 |
| File019.jpg | 5 | 5 | 5 | 5 | 5 | 5 |
| File020.jpg | 5 | 5 | 3 | 3 | 4 | 4 |
| File021.jpg | 3 | 5 | 3 | 5 | 4 | 4 |
| File022.jpg | 3 | 2 | 4 | 3 | 3 | 3 |
| File023.jpg | 3 | 3 | 3 | 3 | 3 | 3 |
| File024.jpg | 2 | 2 | 2 | 2 | 2 | 2 |
| File025.jpg | 1 | 3 | 1 | 2 | 3 | 2 |

F I G. 15

| Slot | Reference Point [cm] | Width [cm] | Height [cm] | Rotation [degrees] |
|---|---|---|---|---|
| K-G8-1 | (1, 1) | 16 | 6 | 0 |
| K-G8-2 | (18, 1) | 11 | 4 | 0 |
| K-G8-3 | (1, 8) | 5 | 2 | 0 |
| K-G8-4 | (6.5, 8) | 5 | 2 | 0 |
| K-G8-5 | (12, 8) | 5 | 2 | 0 |
| K-G8-6 | (17.5, 8) | 5 | 2 | 0 |
| K-G8-7 | (23.0, 8) | 5 | 2 | 0 |

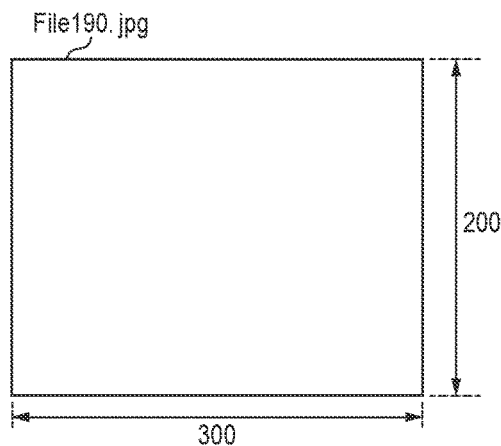
F I G. 19A
F I G. 19B
F I G. 19C
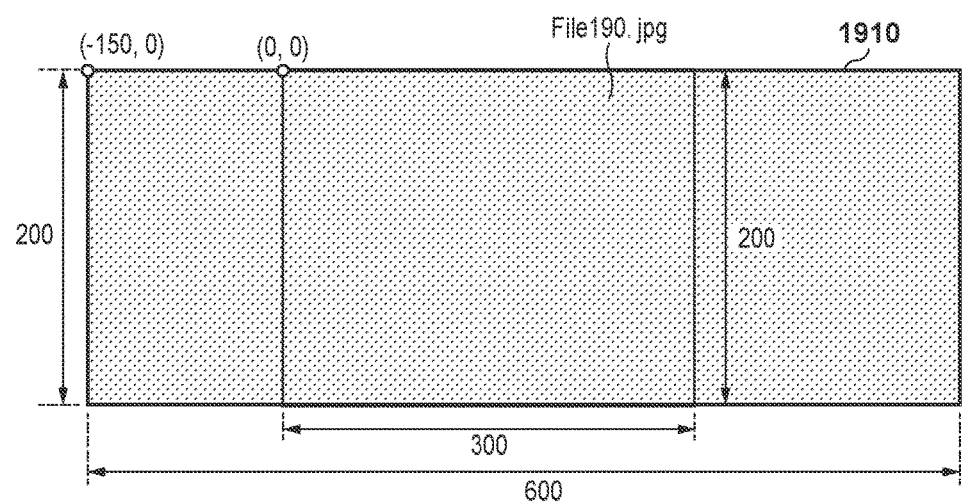

| Slot | Picture |
|---|---|
| K-B-G4-1 | Landscape |
| K-B-G4-2 | Person |
| K-B-G4-3 | Person |
| K-B-G4-4 | Landscape |

INFORMATION PROCESSING APPARATUS AND METHOD OF CONTROLLING THE SAME

BACKGROUND OF THE INVENTION

Field of the Invention

The present invention relates to an electronic photo album creation technique.

Description of the Related Art

In recent years, a product that locates a plurality of still images on a template for a photo album and generates a photo album using a photo album creation application has been released. Such a photo album creation application generally has a mechanism for trimming a still image and editing the still image to be displayed. When one still image is used in a plurality of image display regions (to be abbreviated as slots hereinafter) of a photo album, requesting a user to input an instruction to designate a region to be trimmed every time imposes an inconvenience on the user. There is known a technique of saving trimming information set once in a database and applying the saved trimming information, thereby improving usability. An example is Japanese Patent Laid-Open No. 2003-32470.

However, the technique of the above-described patent literature does not consider a slot to display a still image. That is, since a still image is processed and displayed based on trimming information selected by the user, a result inappropriate for the user may be obtained depending on the combination of a slot and trimming information.

SUMMARY OF THE INVENTION

In order to solve the above-described problem, according to an aspect of the invention, there is provided an information processing apparatus for creating an electronic photo album from a plurality of image files, comprising: a setting unit configured to set, for an image represented by an image file, an area to be displayed in the electronic photo album and store information representing the set area in a memory in association with the image file; and a laying out unit configured to locate the image in a slot, indicating an outer edge of an image to be located, of a template representing a position and a size of at least one slot in a page of interest, wherein the laying out unit determines whether a slot of interest in the page of interest has a predetermined property, and upon determining that the slot of interest has the predetermined property, locates, in the slot of interest, an image assigned to the slot of interest without using the information stored in the memory by the setting unit, and upon determining that the slot of interest does not have the predetermined property, locates, in the slot of interest, a partial image corresponding to the area represented by the information out of the image assigned to the slot of interest.

According to the present invention, when locating an image on each page of an electronic photo album in accordance with a template, whether or not to reflect trimming information concerning trimming set by a user is automatically switched based on the property of a slot in a page. As a result, the user can create a natural electronic photo album without particular awareness.

Further features of the present invention will become apparent from the following description of exemplary embodiments (with reference to the attached drawings).

BRIEF DESCRIPTION OF THE DRAWINGS

FIG. 5 is a flowchart showing an example of processing of automatically creating a photo album;

FIG. 6 is a view showing an example concerning trimming of a still image;

FIG. 7 is a view showing an example of data configured to save and manage whether a slot is a background or not;

FIG. 8 is a view showing an example of data configured to save and manage trimming information in association with a still image;

FIGS. 10A and 10B are views showing examples of the arrangements of photo albums;

FIGS. 13A to 13E are views showing examples of the location relationship between slots and still images and saving/management;

FIG. 14 is a view showing an example of saving/management of the scores of still images;

FIG. 15 is a view showing an example of data representing slot positions;

FIGS. 19A to 19C are views showing an example of trimming information to locate a large area of a still image in a selected slot;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

[First Embodiment]

In the first embodiment, each still image is saved in association with trimming information (to be described later). In this embodiment, when creating an electronic photo album (to be simply referred to as a photo album hereinafter), it is determined based on application determination processing according to the property of a slot whether or not to apply trimming information. Here, a slot indicates an outer frame (to be simply referred to as a frame hereinafter) that defines the shape of the outer edge of an image. Processing of applying (reflecting) trimming information only upon determining to apply will be described. That is, if the property of a slot to locate a still image is not background, it is determined to apply trimming information. If the property of a slot is background, it is determined not to apply trimming information. As a result, whether or not to apply trimming information is switched in accordance with the property of a slot, thereby achieving appropriate display to a user. Note that in this embodiment, an example in which trimming information application determination processing is executed when the user selects a still image to be located in a slot will be described. However, the determination may be done at an arbitrary timing.

Figures 20, 21:
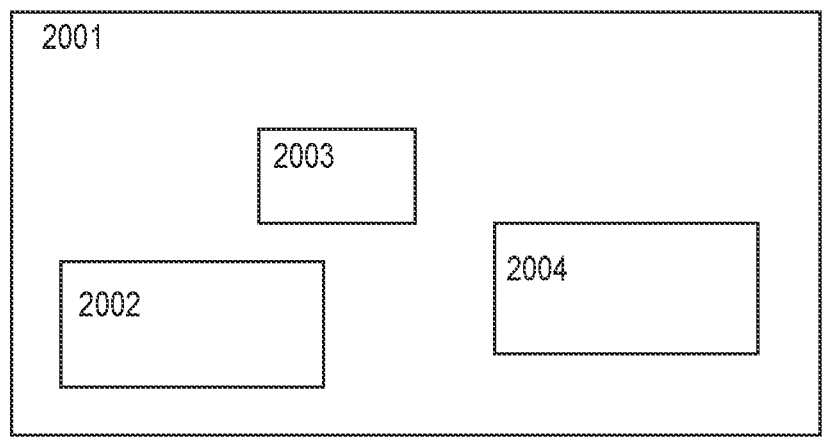
FIG. 20 is a view showing an example of slot layout.
FIG. 21 is a view showing an example of a method of saving and managing whether a recommended still image includes a person or a background.

A slot whose property is background means a slot that is located in a wide area of a page (for example, the slot has an area of a predetermined ratio (for example, 90%) or more with respect to the area of one page) and has another slot existing on it. Note that the ratio may appropriately be set by the user. FIG. 20 is a view showing an example of one page of a photo album including slots. An example of a slot whose property is background will be described with reference to FIG. 20. Referring to FIG. 20, reference numerals 2001 to 2004 denote slots located in a page of interest. Still images are located in these slots. As shown in FIG. 20, one or more slots are set in one page. FIG. 20 shows a state in which the slots 2002 to 2004 are located on the slot 2001. If the slot 2001 is the slot of interest, the still image located in the slot 2001 of interest is partially hidden (made invisible) by the remaining slots 2002 to 2004 located in front of it. The slot 2001 of interest has an area of a predetermined ratio or more with respect to the area of one page. Hence, the property of the slot 2001 is background, and the property of the slots 2002 to 2004 is non-background. If a still image including a largely trimmed person face or object is located in the slot 2001, the still image is partially hidden, and the person or the like cannot be recognized because the slots 2002 to 2004 are overlaid on the slot 2001. A still image such as a landscape showing the theme in the page is preferably placed in a slot like the slot 2001. Hence, the apparatus according to this embodiment determines to apply trimming information if the property of the slot is not background, or determines not to apply trimming information if the property of the slot is background.

Note that trimming information according to this embodiment is information representing a region of a still image to be displayed in a slot. More specifically, trimming information includes the coordinates of the basing point of trimming with respect to the upper left corner of a still image, a width, a height, and a rotation. In the embodiment to be described later, a coordinate on the right side of the basing point is defined as a plus (+) horizontal coordinate, a coordinate on the left side is defined as a minus (−) horizontal coordinate, a coordinate on the lower side is defined as a plus (+) vertical coordinate, and a coordinate on the upper side is defined as a minus (−) vertical coordinate.

Trimming information for an image obtained by decoding a still image file "File001.jpg" will be described with reference to FIG. 6. FIG. 6 is a view showing trimming information representing that a region which has a width "150" and a height "100" and sets a point (10, 10) as the basing point (the coordinates of the upper left corner) in the image of the still image file "File001.jpg" is rotated by a rotation angle "0". That is, a partial image indicated by a region frame 601 in the entire image is the region to be actually located in a slot. Note that the user executes an application according to this embodiment, and then selects an image to form a photo album and performs trimming editing, thereby setting the region 601 to trim the image. Note that even if trimming is set, editing of the original image file is not performed. That is, processing of removing a portion outside the trimming area is not performed. Trimming according to this embodiment is limited to deciding a region to be located in a slot for photo album creation.

Figure 1:
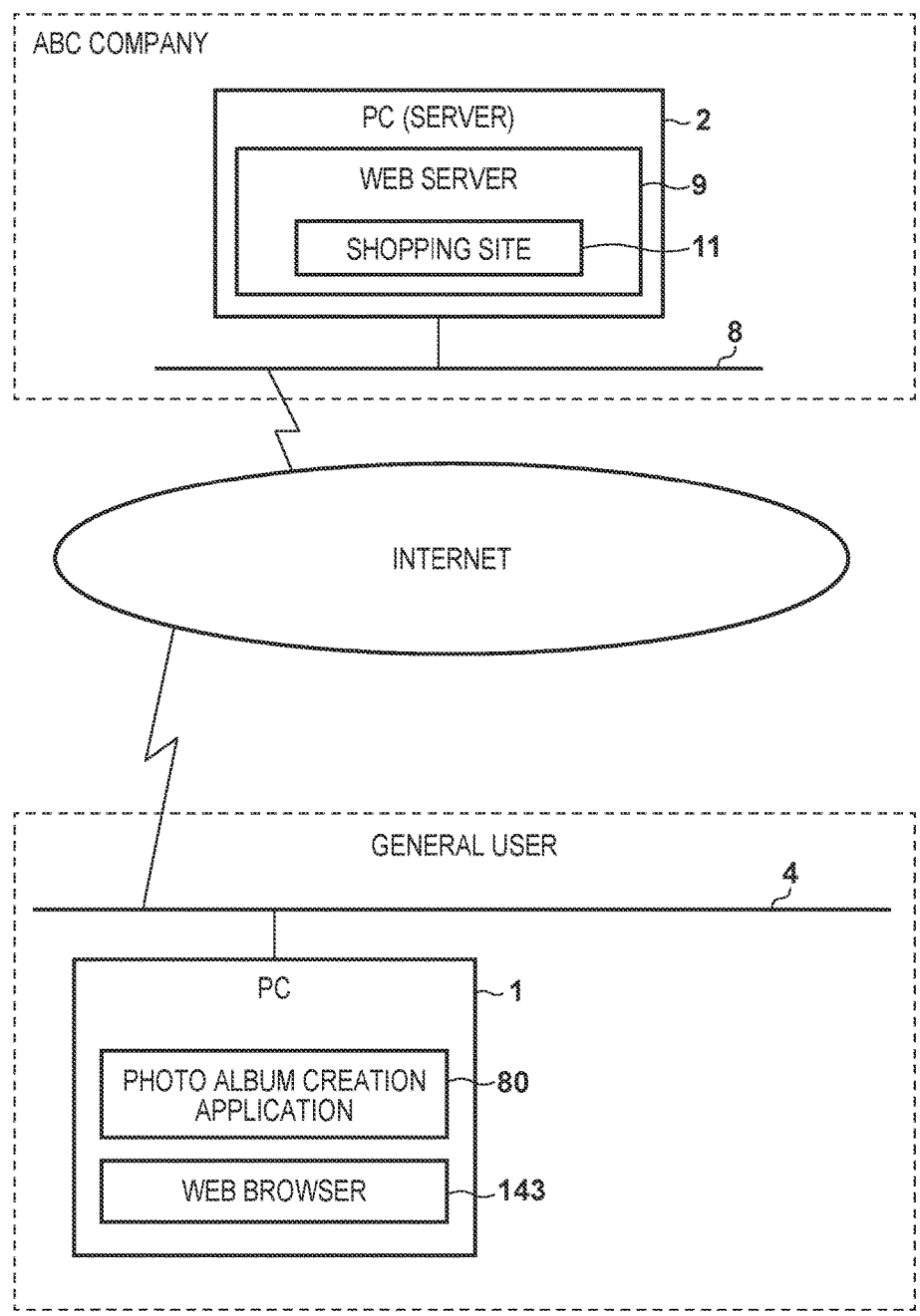
FIG. 1 is a block diagram showing an example of the arrangement of a photo album creation/ordering system according to an embodiment.

FIG. 1 is a block diagram showing an example of the arrangement of a photo album creation/ordering system formed from an information processing apparatus. Referring to FIG. 1, reference numerals 1 and 2 denote information processing apparatuses each formed from a general personal computer or server (to be sometimes abbreviated as a PC hereinafter). Each of the PCs 1 and 2 is formed from hardware to be described later with reference to FIG. 2. As an operating system (to be sometimes abbreviated as an OS hereinafter), an OS equivalent to Windows® 8 or Server 2012 is installed.

The PCs 1 and 2 are connected to networks 4 and 8 formed from Ethernet®, respectively.

Reference numeral 80 denotes a photo album creation application (to be sometimes abbreviated as a creation application hereinafter) formed from a file (*.exe) in an executable format for Windows. Reference numeral 143 denotes a web browser application (to be sometimes abbreviated as a web browser hereinafter). The network 4 is a home network for a general home, which is constructed in a house where the user (customer) who uses the PC 1 lives. The network 8 is an office network constructed in the ABC company (provisional name) that receives the order of an electronic album.

The PC 2 connected to the network 8 includes a web server 9 having the function of a web server, and provides the web site of the ABC company via the Internet. Reference numeral 11 denotes a shopping site on which the ABC company provides a service to users. The user (PC 1) can order a photo album using the shopping site.

Figure 2:
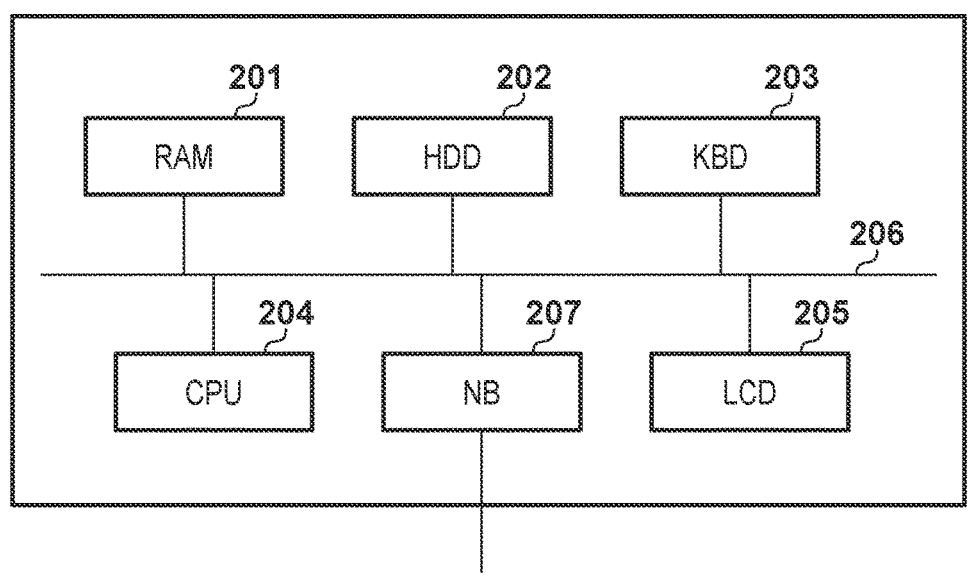
FIG. 2 is a block diagram showing an example of the hardware arrangement of a PC.

FIG. 2 is a block diagram showing an example of the hardware arrangement of a PC. Each of the PCs 1 and 2 is formed from hardware as shown in FIG. 2. A description will be made below using the arrangement of the PC 1.

Figure 3:
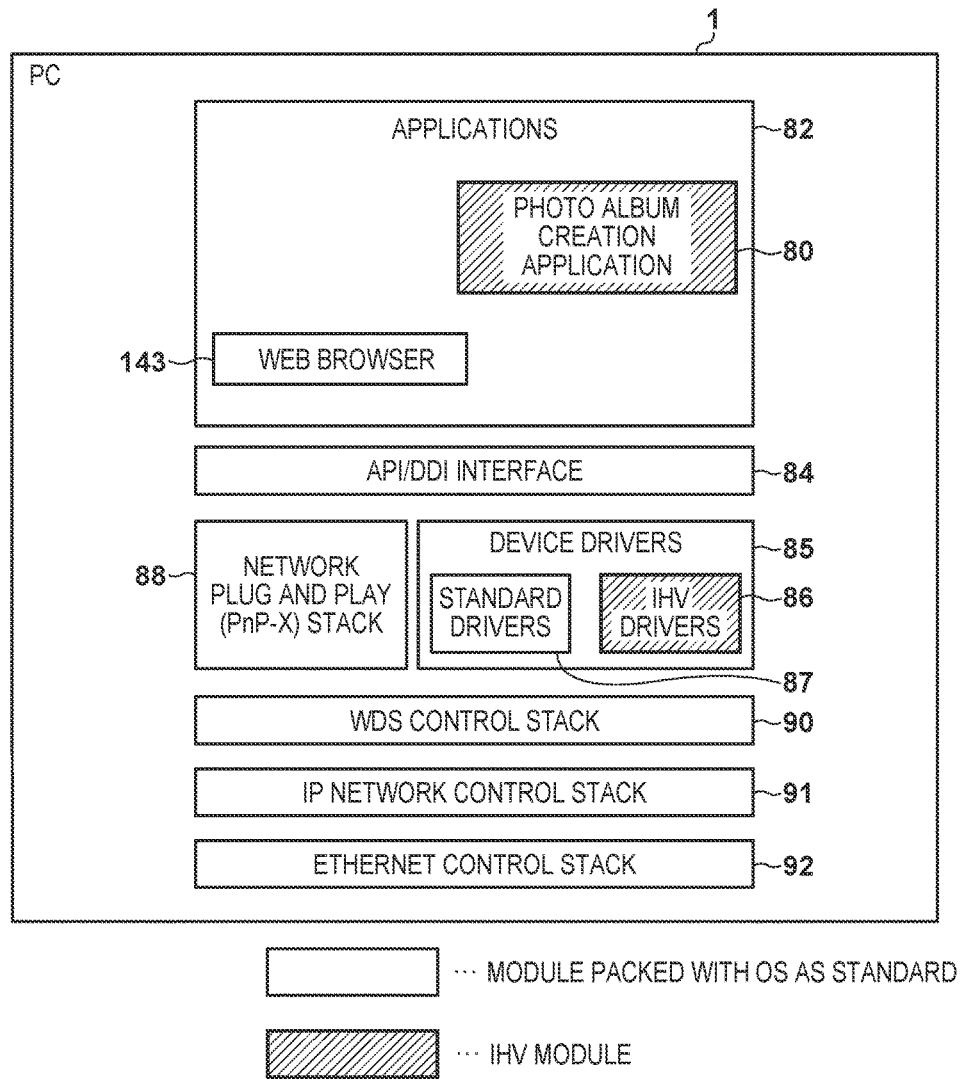
FIG. 3 is a block diagram showing an example of the software configuration of a PC.

The PC 1 includes a random access memory (RAM) 201, a hard disk drive (HDD) 202, a keyboard (KBD, including a pointing device such as a mouse) 203, and a CPU 204. The PC 1 also includes a display (LCD) 205 and a network board (NB) 207. The PC 1 further includes a bus 206 that connects the above-described constituent elements to each other. Note that the HDD 202 is an example of a storage unit. The KBD 203 is an example of an input unit. The CPU 204 is an example of a control unit. The LCD 205 is an example of a display unit. The NB 207 is an example of a communication control unit. Note that the PC 1 may include a storage unit other than the HDD 202. In this case, the storage unit may be a portable CD-ROM or an internally mounted ROM. Applications such as the creation application 80 and the web browser 143 and the modules (software) shown in FIG. 3 are stored in the HDD 202, and read out to the RAM 201 and executed by the CPU 204 as needed. The CPU 204 thus implements the functions of the applications such as the creation application 80 and the web browser 143 and the modules (software) shown in FIG. 3. The HDD 202 stores a plurality of image files captured by the user using a digital camera or the like.

FIG. 3 is a block diagram showing an example of the software configuration of the PC 1. Referring to FIG. 3, reference numeral 92 denotes an Ethernet control stack that controls the Ethernet. Reference numeral 91 denotes an IP network control stack that controls an IP network. Reference numeral 90 denotes a WDS control stack that controls a WSD. Reference numeral 88 denotes a PnP-X control stack that controls the plug and play of the network. Note that PnP-X is short for Plug and Play Extensions that is a function featured as standard in Windows® 8 as a series of extensions of plug and play and provides support to a network connection device. Reference numeral 85 denotes device drivers including standard drivers 87 packed with the OS as standard, and IHV drivers 86 provided by Independent Hardware Vendor (IHV). Reference numeral 84 denotes an application/DDI interface including Application Programming Interface (API) and Device Driver Interface (DDI). Reference numeral 80 denotes the photo album creation application; and 143, the web browser application. Reference numeral 82 denotes applications including the creation application 80 and the web browser 143.

Figure 4A:
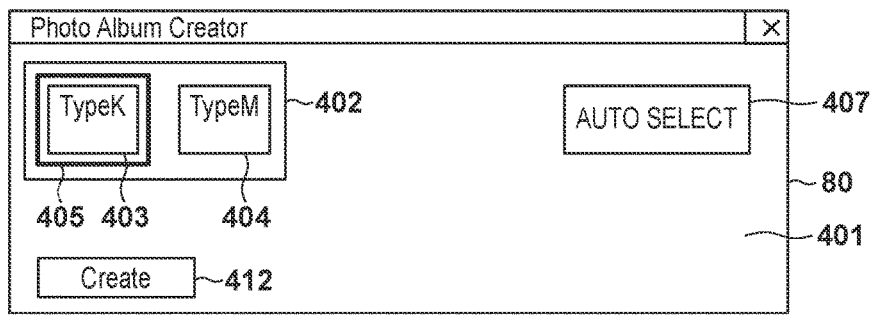
FIGS. 4A to 4D are views showing examples of the UIs of an application.
Figure 4B:
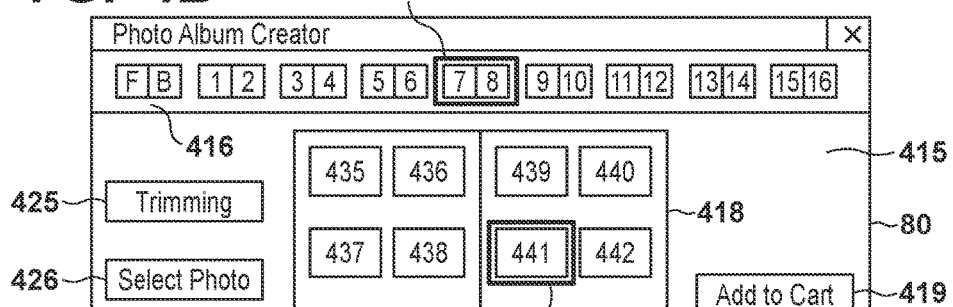
Figure 4C:
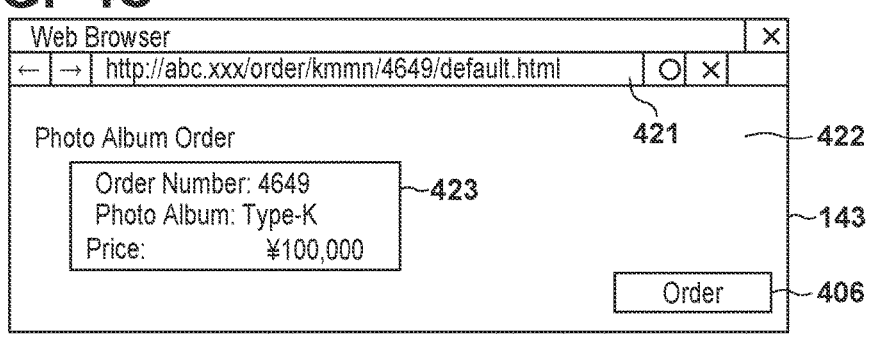
Figure 4D:
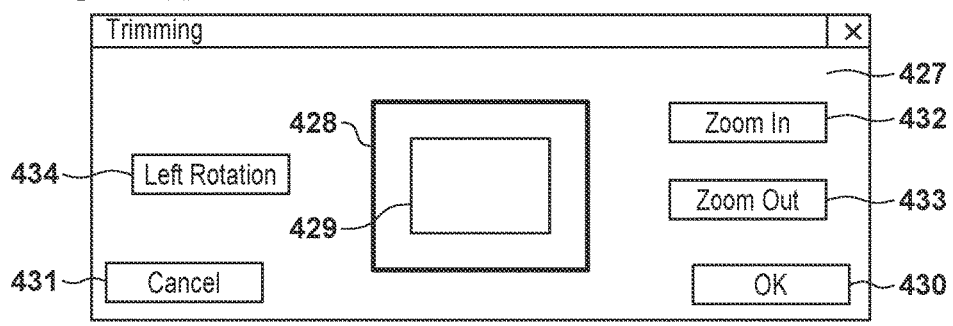

FIGS. 4A to 4D are views showing examples of the screens of the application according to the embodiment. FIG. 4A is a view showing an example of the main screen of the creation application 80. FIG. 4B is a view showing an example of the preview/editing screen of the creation application 80. FIG. 4C is a view showing an example in which a photo album order screen is displayed on the web browser 143. FIG. 4D is a view showing an example of the still image trimming screen of the creation application 80.

Referring to FIG. 4A, reference numeral 401 denotes a main screen of the creation application 80. Reference numeral 402 denotes a photo album type selection portion that can select the type of a photo album to be created from type-K and type-M.

Reference numeral 403 denotes a photo album selection button used to select a photo album of type-K. A photo album of type-K is as follows.
 Shape: 15 cm wide×15 cm high, square
 Number of pages: 20
 Paper type: satin
 Binding: two folding
 Cover: soft Reference numeral 404 denotes a photo album selection button used to select a photo album of type-M. A photo album of type-M is as follows.
 Shape: A4 (210 cm wide×297 cm high), portrait-oriented
 Number of pages: 50
 Paper type: glossy
 Binding: flat
 Cover: hard Reference numeral 405 denotes a photo album selection state indicating mark. This mark is displayed on the photo album selection button associated with the selected photo album. FIG. 4A shows a state in which the user moves the cursor to the photo album selection button 403 by operating the mouse and clicks to select a photo album of type-K. Note that to simplify the explanation of the click operation, it will simply be expressed as "press a target button" hereinafter. Reference numeral 407 denotes an automatic selection button used to automatically select images for an album. Reference numeral 412 denotes a photo album creation button. When the user presses this button, the creation application 80 starts creating a photo album.

Referring to FIG. 4B, reference numeral 415 denotes a preview/editing screen of the creation application 80. Reference numeral 418 denotes a preview display portion in which the creation application 80 displays the preview of a two-page spread of a photo album under creation. Reference numeral 416 denotes a two-page spread selection portion. The user can select, via the two-page spread selection portion, a two-page spread to be displayed in the preview display portion 418. Reference numeral 417 denotes a two-page spread selection state indicating mark. This mark is displayed on the selected two-page spread. FIG. 4B shows a state in which a two-page spread formed from page 7 and page 8 is selected. Reference numerals 435 to 442 denote slots. The slots of the selected two-page spread are displayed, and images are located. Since FIG. 4B shows a state in which a two-page spread formed from page 7 and page 8 is selected, the slots 435 to 438 of page 7 and the slots 439 to 442 of page 8 are displayed. The location and management concerning the slots will be described later. Reference numeral 424 denotes a slot selection state indicating mark. This mark is displayed on the selected slot. FIG. 4B shows a state in which the slot 441 is selected. Reference numeral 419 denotes a purchase article addition button. When purchasing a photo album, the button can add it to a shopping cart (not shown) as an article. When the user presses the purchase article addition button 419, the creation application 80 adds the photo album displayed in the preview display portion 418 to the shopping cart. The user can purchase the photo album added to the shopping cart via an online order site, as shown in FIG. 4C, associated with the shopping cart and a settlement site (not shown) that cooperates with the order site. Note that the online order site, the settlement site, and the shopping cart are the same as a general online order site and a settlement site and shopping cart cooperating with the order site, and a description thereof will be omitted in this embodiment. Reference numeral 425 denotes a trimming button used to trim a still image located in the slot with the slot selection state indicating mark 424. A trimming screen as shown in FIG. 4D is displayed. Reference numeral 426 denotes a still image selection button used to select a still image to be located in the slot with the slot selection state indicating mark 424. A still image in the PC 1 is selected (not shown) to designate the still image to be located in the slot.

Referring to FIG. 4C, reference numeral 421 denotes a URL setting portion in which the user can designate the URL of a web site (page) to be displayed on the web browser 143. The URL of a web site (page) that the web browser 143 is displaying is also displayed here. Reference numeral 422 denotes a photo album order screen displayed on the web browser 143. FIG. 4C shows an example in which a photo album of order number "4649" is ordered. Reference numeral 423 denotes an order information display portion that displays information about the order of the photo album. FIG. 4C shows the following example.
 Order number: 4649
 Photo album type: type-K
 Price: ¥100,000

Reference numeral 406 denotes an order button. The user presses the order button 406, and inputs necessary information such as a name, an address, a telephone number, and a delivery destination in accordance with a screen displayed after that. The user completes settlement in the settlement site, thereby ordering (printing and binding) the photo album created by the creation application 80 and purchasing the album.

Referring to FIG. 4D, reference numeral 427 denotes a trimming screen of the creation application 80 in which the trimming information of a still image can be set. Reference numeral 428 denotes a slot frame display portion that displays the same rectangle as the slot with the slot selection state indicating mark 424. Reference numeral 429 denotes a still image that is the still image located in the slot with the slot selection state indicating mark 424. For example, if the user presses the trimming button 425 in the state shown in FIG. 4B, and the trimming screen 427 is displayed, the rectangle of the slot 441 is displayed in the slot frame display portion 428, and the still image located in the slot 441 is displayed as the still image 429. Reference numeral 430 denotes an OK button with which the trimming information set in the trimming screen 427 is saved (to be described later in detail) in association with the edited still image, and the trimming screen 427 is ended. Reference numeral 431 denotes a cancel button with which the trimming screen 427 is ended without saving the trimming information. Reference numeral 432 denotes a zoom-in (enlargement) button that enlarges the displayed still image 429. Reference numeral 433 denotes a zoom-out (reduction) button that reduces the displayed still image 429. Reference numeral 434 denotes a left rotation button that rotates the displayed still image 429 counterclockwise by 90° with respect to the center point of the still image 429.

On the UI shown in FIG. 4D, the user enlarges the still image 429 so that part of the still image 429 can be seen via the slot frame display portion 428. The partial image is moved in the vertical and horizontal directions (drag operation), rotated (left rotation button 434), and enlarged/reduced (zoom-in/zoom-out button), thereby making an adjustment so as to display a partial region desired by the user. When the user then presses the OK button, information that specifies the partial image displayed in the slot frame display portion 428 at that time is associated with the image file represented by the still image 429 and saved as trimming information.

FIGS. 10A and 10B show the arrangements of photo albums. FIG. 10A is a view showing an example of the arrangement of a photo album of type-K, and FIG. 10B is a view showing an example of the arrangement of a photo album of type-M.

Referring to FIG. 10A, all reference numerals 1001, 1002, 1003, and 1004 concern the photo album of type-K. Reference numeral 1001 denotes a front cover; 1004, a back cover; 1002, a two-page spread including page 1 and page 2 of the album; and 1003, a two-page spread including page 19 and page 20 of the album. In the photo album of type-K, page 1 is the first page, and page 20 is the last page where the album is concerned.

Referring to FIG. 10B, all reference numerals 1011, 1012, 1013, and 1014 concern the photo album of type-M. Reference numeral 1011 denotes a front cover; 1014, a back cover; 1012, a two-page spread including page 1 and page 2 of the album; and 1013, a two-page spread including page 49 and page 50 of the album. In the photo album of type-M, page 1 is the first page, and page 50 is the last page where the album is concerned.

Figure 11A:
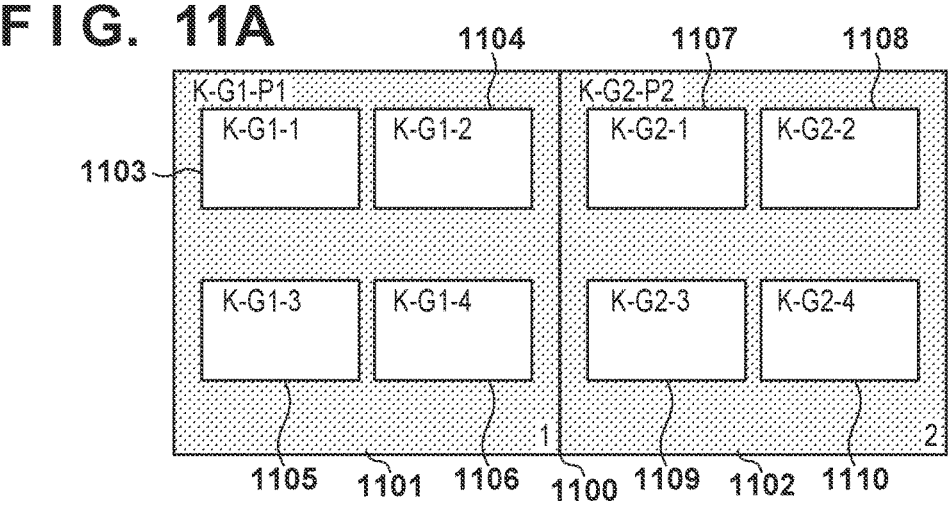
FIGS. 11A to 11C are views showing examples of layout templates.
Figure 11B:
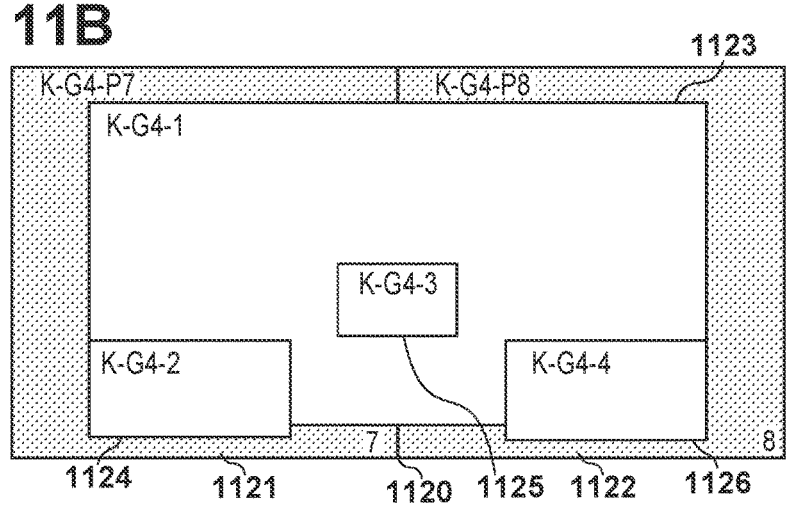
Figure 11C:
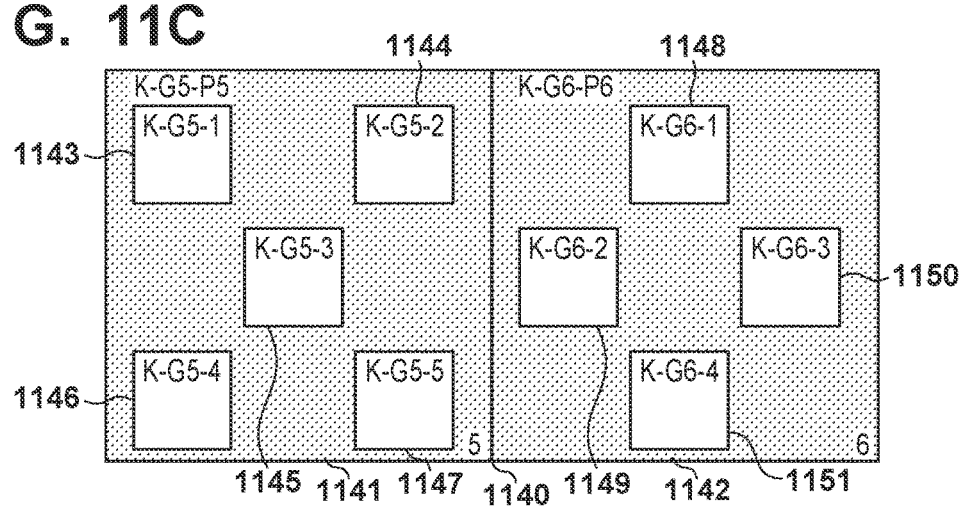

FIGS. 11A to 11C show examples of layout templates (to be sometimes abbreviated as a template hereinafter). Note that FIGS. 11A to 11C are views showing examples of layout templates of a photo album of type-K. Type-K is different from type-M in the shape and size of a page.

Referring to FIG. 11A, reference numeral 1100 denotes a layout template of a two-page spread including page 1 and page 2 of the album out of the layout template of the photo album of type-K. Reference numeral 1101 denotes a layout template of page 1 of the album; and 1102, a layout template of page 2 of the album. Reference numerals 1103, 1104, 1105, and 1106 denote slots located on page 1 of the album. The creation application 80 locates still images in these slots. The slots 1103, 1104, 1105, and 1106 belong to the region of group 1. A code K-G1-P1 added to the template 1101 represents the attribute of the template. Sequentially from left, K indicates that the template is used for a photo album of type-K, G1 indicates that the template is used for the region of group 1, and P1 indicates that the template is used for page 1 of the album. Codes K-G1-1, K-G1-2, K-G1-3, and K-G1-4 added to the slots 1103, 1104, 1105, and 1106 represent the attributes of the slots. Sequentially from left, K-G1 indicates the same contents as described above, and the last number is a slot number. The slot number is assigned on a group basis. Reference numerals 1107, 1108, 1109, and 1110 denote slots located on page 2 of the album. The creation application 80 locates still images in these slots. The slots 1107, 1108, 1109, and 1110 belong to the region of group 2. A code K-G2-P2 added to the template 1102 represents the attribute of the template. Sequentially from left, K indicates the same contents as described above, G2 indicates that the template is used for the region of group 2, and P2 indicates that the template is used for page 2 of the album. Codes K-G 2-1, K-G2-2, K-G2-3, and K-G2-4 added to the slots 1107, 1108, 1109, and 1110 represent the attributes of the slots. Sequentially from left, K-G2 indicates the same contents as described above, and the last number is a slot number. The slot number is assigned on a group basis. FIG. 11A shows an example in which regions are put into a group on a page basis, and all slots in the group (one page on one side) belong to the regions of the same group.

Referring to FIG. 11B, reference numeral 1120 denotes a layout template of a two-page spread including page 7 and page 8 of the album out of the layout template of the photo album of type-K. Reference numeral 1121 denotes a layout template of page 7 of the album; and 1122, a layout template of page 8 of the album. Reference numeral 1124 denotes a slot located on page 7 of the album; and 1126, a slot located on page 8 of the album. Reference numerals 1123 and 1125 denote slots located across both page 7 and page 8 of the album. The creation application 80 locates still images in these slots. A template attribute "K-G4-1" added to the slot 1123 indicates that an image serving as a background is located in the slot.

The slots 1123, 1124, 1125, and 1126 belong to the region of group 4. A code K-G4-P7 added to the template 1121 and a code K-G4-P8 added to the template 1122 represent the attributes of the templates. Sequentially from left, K indicates that the template is used for a photo album of type-K, G4 indicates that the template is used for the region of group 4, P7 indicates that the template is used for page 7 of the album, and P8 indicates that the template is used for page 8 of the album. Codes K-G4-1, K-G4-2, K-G4-3, and K-G4-4 added to the slots 1123, 1124, 1125, and 1126 represent the attributes of the slots. Sequentially from left, K-G4 indicates the same contents as described above, and the last number is a slot number. The slot number is assigned on a group basis. FIG. 11B shows an example in which regions are put into a group on a two-page spread basis, and all slots in the group (two-page spread) belong to the regions of the same group.

Referring to FIG. 11C, reference numeral 1140 denotes a layout template of a two-page spread including page 5 and page 6 of the album out of the layout template of the photo album of type-K. Reference numeral 1141 denotes a layout template of page 5 of the album; and 1142, a layout template of page 6 of the album. Reference numerals 1143, 1144, 1145, 1146, and 1147 denote slots located on page 5 of the album. The creation application 80 locates still images in these slots. The slots 1143, 1144, 1145, 1146, and 1147 belong to the region of group 5. A code K-G5-P5 added to the template 1141 represents the attribute of the template. Sequentially from left, K indicates that the template is used for a photo album of type-K, G5 indicates that the template is used for the region of group 5, and P5 indicates that the template is used for page 5 of the album. Codes K-G5-1, K-G5-2, K-G5-3, K-G5-4, and K-G5-5 added to the slots 1143, 1144, 1145, 1146, and 1147 represent the attributes of the slots. Sequentially from left, K-G5 indicates the same contents as described above, and the last number is a slot number. The slot number is assigned on a group basis. Reference numerals 1148, 1149, 1150, and 1151 denote slots located on page 6 of the album. The creation application 80 locates still images in these slots. The slots 1148, 1149, 1150, and 1151 belong to the region of group 6. A code K-G6-P6 added to the template 1142 represents the attribute of the template. Sequentially from left, K indicates the same contents as described above, G6 indicates that the template is used for the region of group 6, and P6 indicates that the template is used for page 6 of the album. Codes K-G6-1, K-G6-2, K-G6-3, and K-G6-4 added to the slots 1148, 1149, 1150, and 1151 represent the attributes of the slots. Sequentially from left, K-G6 indicates the same contents as described above, and the last number is a slot number. The slot number is assigned on a group basis. FIG. 11C shows an example in which regions are put into a group on a page basis, and all slots in the group (one page on one side) belong to the regions of the same group.

Figure 12A:
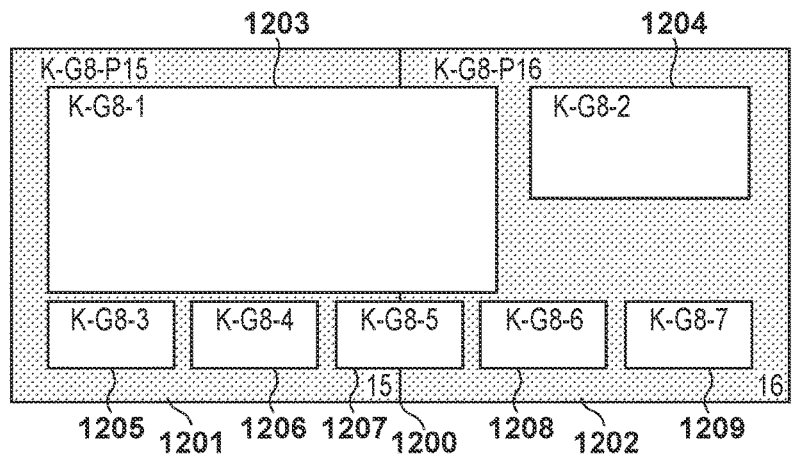
FIGS. 12A and 12B are views showing an example of a layout template and slot management.
Figure 12B:
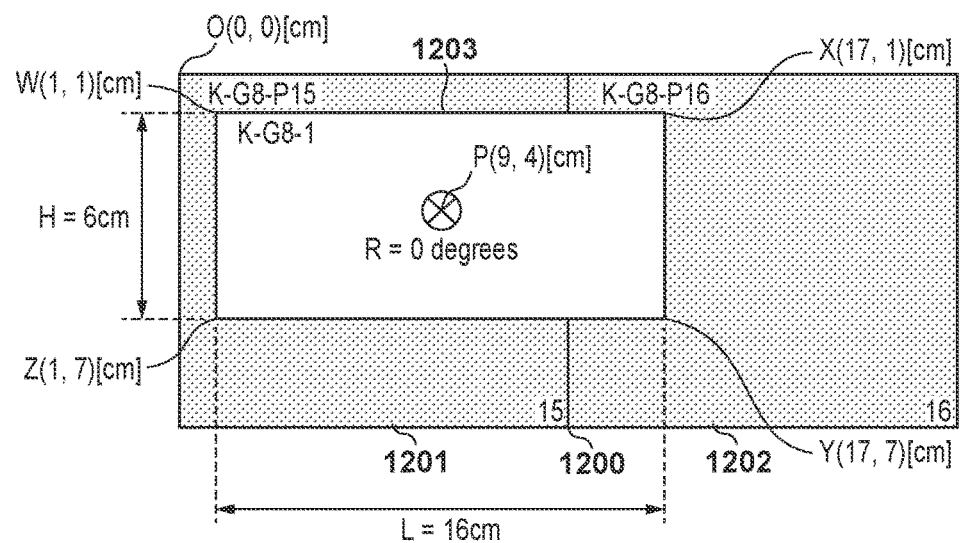

FIGS. 12A and 12B are views showing an example of a method of managing a layout template and slots. FIG. 12A is a view showing an example of the layout template of a photo album of type-K, and FIG. 12B is a view showing an example of a slot management method. FIG. 12A shows an example in which the layout template shown in FIG. 11B is modified, and still images are located in appropriate slots. Referring to FIG. 12A, reference numeral 1200 denotes a layout template of a two-page spread including page 15 and page 16 of the album out of the layout template of a photo album of type-K. Reference numeral 1201 denotes a layout template of page 15 of the album; and 1202, a layout template of page 16 of the album. Reference numerals 1205 and 1206 denote slots located on page 15 of the album; and 1204, 1208, and 1209, slots located on page 16 of the album. Reference numerals 1203 and 1207 denote slots located across both page 15 and page 16 of the album. The creation application 80 locates still images in these slots. The slots 1203, 1204, 1205, 1206, 1207, 1208, and 1209 belong to the region of group 8. A code K-G8-P15 added to the template 1201 and a code K-G8-P16 added to the template 1202 represent the attributes of the templates. Sequentially from left, K indicates that the template is used for a photo album of type-K, G8 indicates that the template is used for the region of group 8, P15 indicates that the template is used for page 15 of the album, and P16 indicates that the template is used for page 16 of the album. Codes K-G8-1, K-G8-2, K-G8-3, K-G8-4, K-G8-5, K-G8-6, and K-G8-7 added to the slots 1203, 1204, 1205, 1206, 1207, 1208, and 1209 represent the attributes of the slots. Sequentially from left, K-G8 indicates the same contents as described above, and the next number is a slot number. The slot number is assigned on a group basis. FIG. 12A shows an example in which regions are put into a group on a two-page spread basis, and all slots in the group (two-page spread) belong to the regions of the same group.

FIG. 12B is a view showing an example of a slot management method using the layout template of the photo album of type-K. Since FIG. 12B is a view that focuses on the slot management method based on FIG. 12A, the slots other than the slot 1203 are not illustrated for the descriptive convenience. Referring to FIG. 12B, a point O is the basing point of the photo album. The creation application 80 defines the position of each slot using the upper left corner of the two-page spread of the photo album as the basing point, and controls image location to each slot. The creation application 80 defines a coordinate on the right side of the point O as a plus (+) horizontal coordinate, a coordinate on the left side as a minus (−) horizontal coordinate, a coordinate on the lower side as a plus (+) vertical coordinate, and a coordinate on the upper side as a minus (−) vertical coordinate. The coordinates of each point are expressed as (horizontal coordinate, vertical coordinate). For example, the coordinates of the point O are (0, 0) [unit: cm]. A point W is the basing point of the slot 1203, which matches the upper left corner of the slot. In this way, the basing point of each slot is set at the upper left corner of the slot. The point W exists 1 cm rightward away and 1 cm downward away from the point O. The coordinates are (1, 1) [unit: cm]. L is the width of the slot 1203, which is 16 cm. H is the height of the slot 1203, which is 6 cm. The points of the rectangle of the slot 1203 and their coordinates are a point X (17, 1) [unit: cm], a point Y (17, 7) [unit: cm], and a point Z (1, 7) [unit: cm]. A point P is the middle point of the slot 1203, and its coordinates are (9, 4) [unit: cm]. R is the rotation angle of the slot 1203. In the example of FIG. 12B, the slot 1203 is not rotated. Hence, the rotation angle is 0°. The creation application 80 thus defines each slot located in the layout template using its coordinates and rotation angle, and uses the information for control.

FIGS. 13A to 13E are views showing examples of a method of saving and managing the relationship between slots and still images. FIGS. 13A and 13B are views showing an example of a method of saving and managing the location relationship between slots and still images in the template 1102. FIGS. 13C and 13D are views showing an example of a method of saving and managing the location relationship between slots and still images in the template 1141. FIG. 13E is a view showing an example of a method of saving and managing the location relationship between slots and still images in the template 1200. In these drawings, Album Type is a photo album type, Group is a region (group) number, Page is a page number, Slot is a slot number, File is a file name, and Trimming is trimming information used when locating a still image in a slot. That is, when displaying each Slot, the image of a still image file designated by File undergoes trimming based on trimming information saved in Trimming and is located in corresponding Slot. Trimming is divided into Point (the basing point of a trimming region), Width (the width of a trimming region), Height (the height of a trimming region), and Rotation (rotation angle). For example, a slot 131 shown in FIG. 13A indicates that the still image of a still image file "File001.jpg" is used. As shown in FIG. 6, Point (10, 10) of the image is defined as the basing point at the position of the upper left corner of the trimming region. A region having Width of 150 [cm] and Height of 100 [cm] in the image whose basing point is set at the upper left corner of the trimming region is rotated by Rotation of 0 [degrees], and the resultant partial image 601 is located in the corresponding slot. Referring to FIGS. 13A and 13B, the slots of slot numbers 1 to 4 correspond to the slots 1107 to 1110, respectively. Referring to FIGS. 13C and 13D, the slots of slot numbers 1 to 5 correspond to the slots 1143 to 1147, respectively. Referring to FIG. 13E, the slots of slot numbers 1 to 7 correspond to the slots 1203 to 1209, respectively. In this embodiment, "*.jpg" (* is an arbitrary character string) is a general still image file name of a photo or the like captured by a digital still camera or the like and saved in the HDD 202.

FIG. 14 is a view showing an example of a method of saving and managing the evaluation values of still images. Referring to FIG. 14, File is a file name, Elements are elements that define appropriateness (goodness) as an image for a photo album, and Score is a score (evaluation value). Elements include Color (color), Contrast (contrast), Brightness (brightness), Focus (focus), and Composition (composition). Each element is expressed as a point on a scale of 0 (lowest) to 10 (highest), and represents appropriateness (goodness) as an image for a photo album. Score is the score of an image, which is the average value of the points of Color (color), Contrast (contrast), Brightness (brightness), Focus (focus), and Composition (composition). When locating a still image in each slot, the creation application 80 employs the scores of the images and uses them for a comparison test of a more appropriate (better) image.

FIG. 15 is a view showing an example of slot positions. Referring to FIG. 15, Slot is a slot number, Reference Point is the basing point of a slot, Width is the width of a slot, Height is the height of a slot, and Rotation is the rotation angle of a slot. FIG. 15 shows an example of the positions of the slots 1203 to 1209 of the template 1200 shown in FIG. 12A.

FIG. 7 is a view showing an example of a method of saving and managing whether a slot is a background or not (non-background) as the property of a slot. Referring to FIG. 7, Slot is a slot number, and Background is a true/false value representing whether a slot is a background (TRUE) or not (FALSE). FIG. 7 shows whether each of the slots of the layout template shown in FIG. 11B is a background or not.

FIG. 8 is a view showing an example of a method of saving and managing trimming information set for a still image in the HDD 202 in association with the still image. Referring to FIG. 8, File is a file name, and Trimming is trimming information of a still image represented by a corresponding image file. That is, the image file and the trimming information are stored and managed in association with each other. Trimming is divided into elements including Point (basing point), Width (width), Height (height), and Rotation (rotation angle). Point is the basing point of a trimming region in a still image (the position of the upper left corner of a trimming region in this embodiment), Width is the width of a trimming region, Height is the height of a trimming region, and Rotation is the rotation angle. When applying trimming information, Trimming saved and managed as shown in FIG. 8 is applied. The information shown in FIG. 8 is created when the user performs trimming processing for each image file stored and managed in the apparatus.

FIG. 5 is a flowchart showing an example of processing of part of the creation application 80 that automatically creates a photo album. A program associated with the flowchart of FIG. 5 is stored in the HDD 202, read out to the RAM 201, and executed by the CPU 204. When the user selects the automatic selection button 407 shown in FIG. 4A, and presses the photo album creation button 412, the CPU 204 executes the processing from step S501 in accordance with the flowchart shown in FIG. 5.

In step S502, the CPU 204 that is executing the creation application 80 selects a folder (not shown) in the PC 1 in which a still image file is stored or a still image in the PC 1 in accordance with a user operation. That is, the storage locations of images or images necessary for creating a photo album are designated. Note that in step S502, a path (designated by the user) representing the storage location of a folder may be read out from an environment file, a registry, or the like.

In step S505, concerning each still image in the image files necessary when creating a photo album, the CPU 204 analyzes appropriateness (goodness) as an image for a photo album, and adds a score to each still image in accordance with the appropriateness (goodness). When locating a still image in each slot, the creation application 80 employs the scores of images shown in FIG. 14 and uses them for a comparison test of a more appropriate (better) image. Processing of locating a still image in each slot and creating a photo album will be described below using the layout template 1100 shown in FIG. 11A as an example. In step S507, the CPU 204 locates a still image in each slot of layout templates for a photo album of type-K including the layout template 1100 in descending order of score. In step S512, the CPU 204 ends the processing of automatically creating a photo album, and displays the preview/editing screen 415 shown in FIG. 4B.

Note that in step S507, the CPU 204 trims an image to be located in each slot in accordance with the shape and size of the slot, and lays out a trimmed partial image in each slot. At this time, whether or not to use the trimming information is switched based on the property of each slot. Details of the switching processing will be described later.

Figure 9:
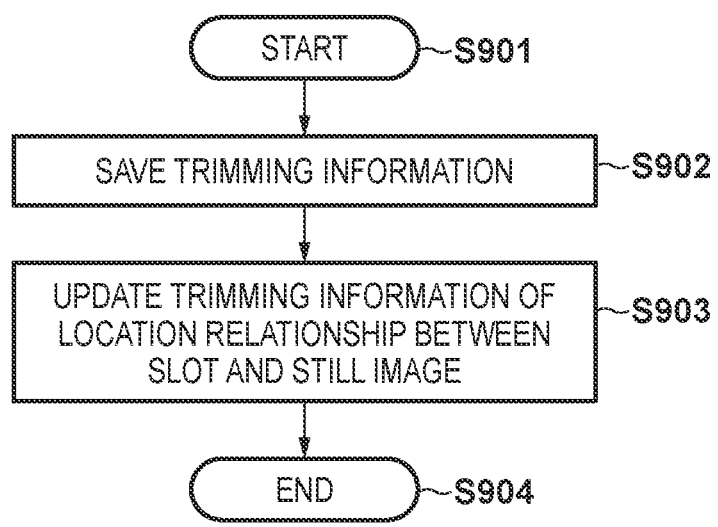
FIG. 9 is a flowchart showing processing of saving trimming information in association with a still image.

FIG. 9 is a flowchart showing an example of processing of saving trimming information in association with a still image, which is part of the creation application 80. A program associated with the flowchart of FIG. 9 is stored in the HDD 202, read out to the RAM 201, and executed by the CPU 204. When the user presses the OK button 430 shown in FIG. 4D, the CPU 204 that is executing the creation application 80 executes the processing from step S901 in accordance with the flowchart shown in FIG. 9.

In step S902, the CPU 204 saves and manages trimming information set in the trimming screen, as shown in FIG. 8 described above, in a memory such as the RAM 201 or the HDD 202 in association with a still image. In step S903, the CPU 204 saves and manages the trimming information set in the trimming screen as the location relationship between a slot and a still image, as shown in FIG. 13 described above. In step S904, the CPU 204 ends the processing of saving the trimming information. When locating a still image in each slot, the CPU 204 locates a still image in a slot based on the location relationship between the slot and the still image managed as shown in FIG. 13. For this reason, the trimming information set in the trimming screen is reflected on the preview/editing screen 415 (FIG. 4B).

Figure 16:
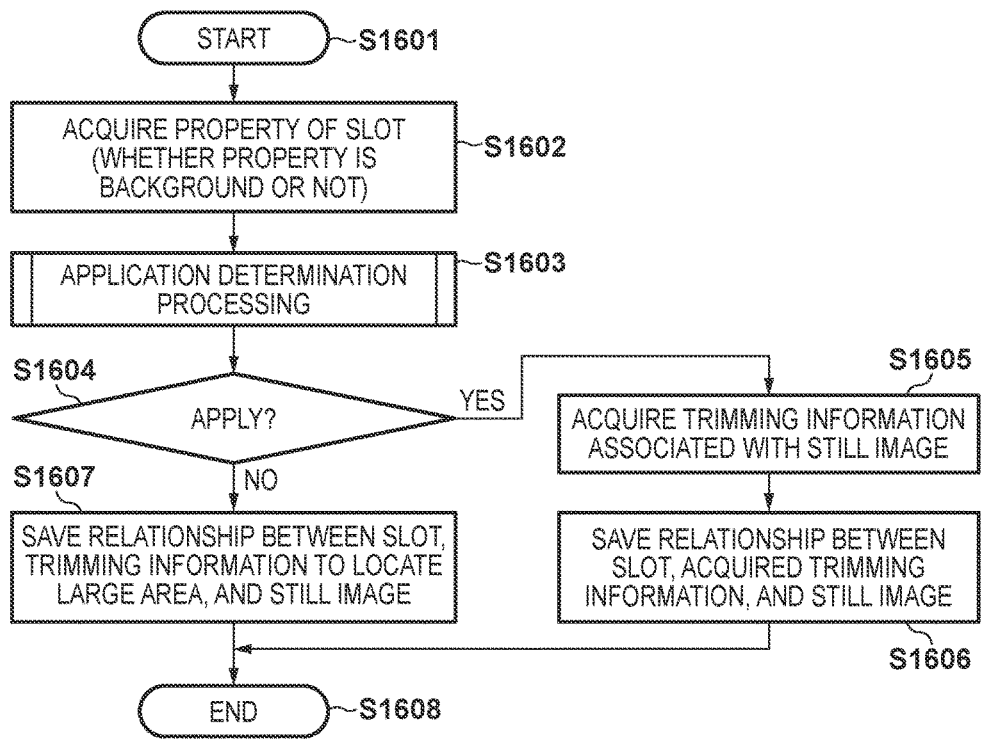
FIG. 16 is a flowchart showing an example of processing of selecting a still image to be located in a slot.

FIG. 16 is a flowchart showing an example of image selection processing and trimming information application processing, which is part of the creation application 80. A program associated with the flowchart of FIG. 16 is stored in the HDD 202, read out to the RAM 201, and executed by the CPU 204.

When the user presses the still image selection button 426 shown in FIG. 4B, and selects a still image to be located in a slot, the CPU 204 executes the processing from step S1601 in accordance with the flowchart shown in FIG. 16. In step S1602, the CPU 204 acquires whether the property of a slot for which a still image is selected is background or not. As shown in FIG. 7, the CPU 204 saves and manages, as the property of a slot, whether a slot is a background or not, based on a template attribute corresponding to each slot of a template described with reference to FIGS. 11A to 11C. In step S1603, the CPU 204 executes application determination processing shown in FIG. 17 to be described later. In step S1604, if the CPU 204 determines to apply as the result of the application determination processing executed in step S1603, the process advances to step S1605. If the CPU 204 determines not to apply, the process advances to step S1607. In step S1605, the CPU 204 acquires trimming information associated with the still image to be located in the slot. The CPU 204 saves and manages trimming information set for a still image in association with the still image, as shown in FIG. 8. In step S1606, the CPU 204 saves and manages the location relationship between the slot, the acquired trimming information, and the still image, as shown in FIGS. 13A to 13E described above. On the other hand, in step S1607, the CPU 204 saves and manages the location relationship between the slot, trimming information to locate, in the slot, a large area of the still image to be located in the selected slot, and the still image, as shown in FIGS. 13A to 13E described above. In step S1608, the CPU 204 ends the image selection processing and trimming application processing.

The information saved and managed in step S1606 or S1607 of FIG. 16 is reflected when the corresponding image is laid out in the corresponding slot in step S507 of FIG. 5. More specifically, in step S507, the CPU 204 trims a trimming region represented by the layout information saved and managed in step S1606 or S1607 from the corresponding image, and locates the image in the corresponding slot.

Note that when the CPU 204 locates the partial image in the slot in step S507, trimming need not always be performed. For example, the CPU 204 may display the image as a layer under the template. In this case, the CPU 204 locates the entire image as a layer under the template such that the partial image corresponding to the layout information is located at a position corresponding to the slot. In this case as well, only the partial image corresponding to the trimming region in the image is displayed, as in a case in which the partial image is trimmed.

Figure 17:
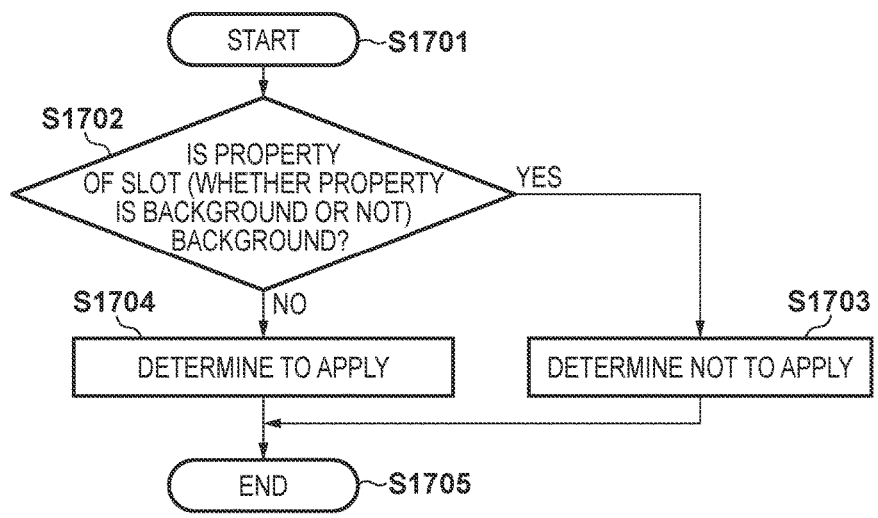
FIG. 17 is a flowchart showing an example of determining whether or not to apply trimming information based on the property of a slot.

FIG. 17 is a flowchart showing detailed processing contents of step S1603 of FIG. 16. The CPU 204 starts processing of determining whether or not to apply trimming information from step S1701 of FIG. 17. In step S1702, the CPU 204 determines whether the property (or attribute) of the slot acquired in step S1602 of FIG. 16 is background or not. If the property is background, the process advances to step S1703. Otherwise, the process advances to step S1704. In step S1704, the CPU 204 determines to apply trimming information associated with the still image. On the other hand, in step S1703, the CPU 204 determines not to apply trimming information associated with the still image. In step S1705, the CPU 204 ends the processing of determining whether or not to apply trimming information, and returns to the invocation source of the processing.

Figure 18A:
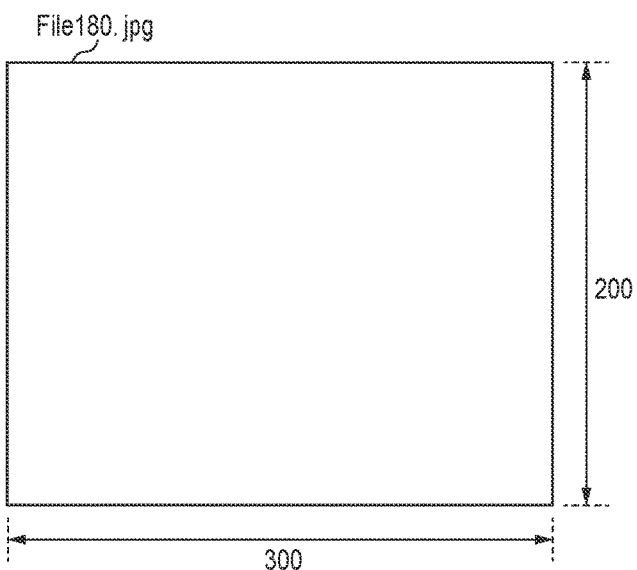
FIGS. 18A to 18C are views showing an example of trimming information to locate a large area of a still image in a selected slot.
Figure 18B:
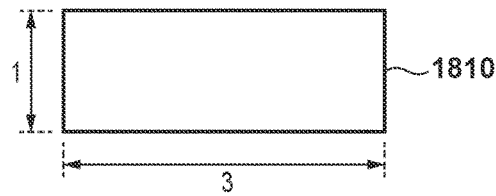
Figure 18C:
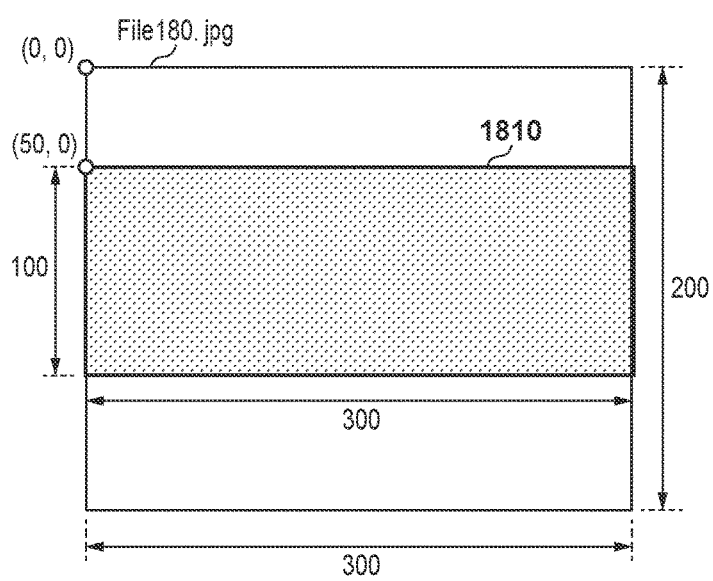

FIGS. 18A to 18C are views showing an example of trimming information to locate, in a slot, a large area of a still image to be located in the selected slot. Note that FIGS. 18A to 18C show an example in which a setting is done not to form, in the slot, a region where a still image is not displayed, and the trimming region indicating a region to display a still image is maximized. FIG. 18A shows the size of a still image. FIG. 18A shows that the image of a still image file "File180.jpg" has a width of 300 and a height of 200. FIG. 18B shows the aspect ratio of the rectangle of a slot. FIG. 18B shows that the ratio of the width and height of the rectangle of a slot 1810 is 3 : 1. FIG. 18C is a view showing trimming information when locating a large area of the still image in the slot. FIG. 18C is a view showing that the trimming information that makes the entire still image shown in FIG. 18A fit in the slot 1810 shown in FIG. 18B defines a basing point (50, 0), a width of 300, and a height of 100 based on the upper left corner of the still image. That is, the trimming information that makes the entire still image fit in the slot defines the maximum values of the width and height of trimming, which do not exceed the width and height of the still image while maintaining the rectangle of the slot. The basing point of trimming means the basing point in a case in which the rectangle having the width and height of trimming is located at the center of the still image. Note that FIG. 18C illustrates the basing point to locate the rectangle of trimming at the center of the image. This location is decided based on the trimming information saved in advance in association with the image.

FIGS. 19A to 19C are views showing an example of trimming information to locate, in a slot, a large area of a still image to be located in the selected slot. Note that FIGS. 19A to 19C show an example of trimming information to locate an entire still image in a slot. FIG. 19A shows the size of the still image of a still image file "File190.jpg". FIG. 19A shows that the still image has a width of 300 and a height of 200. FIG. 19B shows the aspect ratio of the rectangle of a slot. FIG. 19B shows that the ratio of the width and height of the rectangle of a slot is 3:1. FIG. 19C is a view showing trimming information when locating a large area of the still image in the slot. FIG. 19C is a view showing trimming information when locating the still image shown in FIG. 19A in the slot. FIG. 19C is a view indicating that the trimming information that makes the entire still image shown in FIG. 19A fit in a slot 1910 shown in FIG. 19B defines a width of 600 and a height of 200. That is, the trimming information that makes the entire still image fit in the slot means that the width and height of the trimming information maintain the rectangle of the slot, and a larger one of the width and height of the still image has a maximum value not less than that of trimming. Note that two examples of trimming information to display a large area of a still image have been described above. However, trimming information to display a large area of a still image by a method other than those of the above two examples may be used.

As described above, if a slot in a page does not have the property (attribute) of background, trimming information is applied. If a slot has the property of background, trimming information is not applied. This enables appropriate display to the user. Note that in the first embodiment, application determination processing is executed at the timing when the user presses the still image selection button 426 shown in FIG. 4B, and selects a still image. However, it is not limited to the timing when image selection is performed. For example, the processing can be executed at an arbitrary timing such as the timing of image replacement (not shown) between slots. Additionally, in this embodiment, information representing whether a slot is a background or not is saved and managed on a slot basis as the property of a slot. However, the embodiment is not limited to this, and information such as the size or aspect ratio of a slot may be saved and managed as the property of a slot. In the first embodiment, it is determined by application determination processing whether or not to apply trimming information, based on whether the property of a slot is background or not. However, the embodiment is not limited to this. For example, whether or not to apply trimming information may be determined based on information such as the size or aspect ratio of a slot. Furthermore, trimming information is not limited to the basing point, width, height, and rotation angle of trimming, and may include general image processing such as automatic photo correction, red eye correction, and brightness correction.

Note that in the embodiment, one of the conditions of a slot having the property of background is that a slot has an area of a predetermined ratio or more with respect to an entire page. However, this condition may be excluded by user setting. That is, a slot partially hidden by another slot may be defined as a slot having the property of background by the user setting.

[Second Embodiment]

In the above-described first embodiment, information representing whether the property of a slot indicates background or not is saved and managed. Determination processing is executed to apply set trimming information to an image selected by the user if the property of a slot is not background and not to apply if the property is background. As a characteristic feature of the second embodiment, information representing whether a still image recommended by the property of a slot is person or landscape is saved and managed. Determination processing is executed to apply trimming information if the recommenced still image is person and not to apply if the recommenced still image is landscape. Note that only the difference between the first embodiment and the second embodiment will be described.

FIG. 20 is a view showing an example of one page of an album including slots. An example in which slots whose recommenced still image is person and slots whose recommenced still image is landscape are located will be described with reference to FIG. 20. Referring to FIG. 20, if a photo including a largely trimmed person face or object is located in a slot 2001, it may be impossible to recognize the person or the like because of the existence of slots 2002 to 2004. That is, in general, the recommenced still image of a slot serving as a background is landscape in many cases. Hence, in the second embodiment, if the recommenced still image to be located in a slot is person, it is determined to apply trimming information. If the recommenced still image is landscape, it is determined not to apply trimming information.

FIG. 21 shows the properties of slots on a template according to the second embodiment. Referring to FIG. 21, Slot represents a slot number, and Picture represents whether a recommenced still image is Person or Landscape. FIG. 21 shows whether recommenced still images on the layout template shown in FIG. 11B are person or landscape.

As in the first embodiment, an image to be pasted in each slot is designated by the user out of image files saved in an HDD 202. Hence, the user may assign a still image including a person face to a slot having the property of landscape. In the second embodiment, if such an operation is performed, the operation is disabled. A message that prompts the user to select another still image file is displayed, and the operation is disabled. Hence, when the user selects a still image file to be pasted in a slot that has the property of landscape and is in an active state under selection of the user (for example, FIG. 4B), it is determined whether a person face having a preset size or more exists in the still image. If a face of the preset size or more exists in the selected still image, the message as described above is displayed, and the operation is disabled. Upon determining that a face of the preset size or more does not exist in the selected still image, the selected still image is certified as landscape. Hence, the trimming information of the selected still image is not applied. Note that the technique of detecting a person face in an image is known, and a description thereof will be omitted.

On the other hand, when a still image is pasted in a slot having the property of person, the determination is not done, and the still image (either person or landscape) designated by the user is assigned. At this time, it is decided to apply trimming information.

Figure 22:
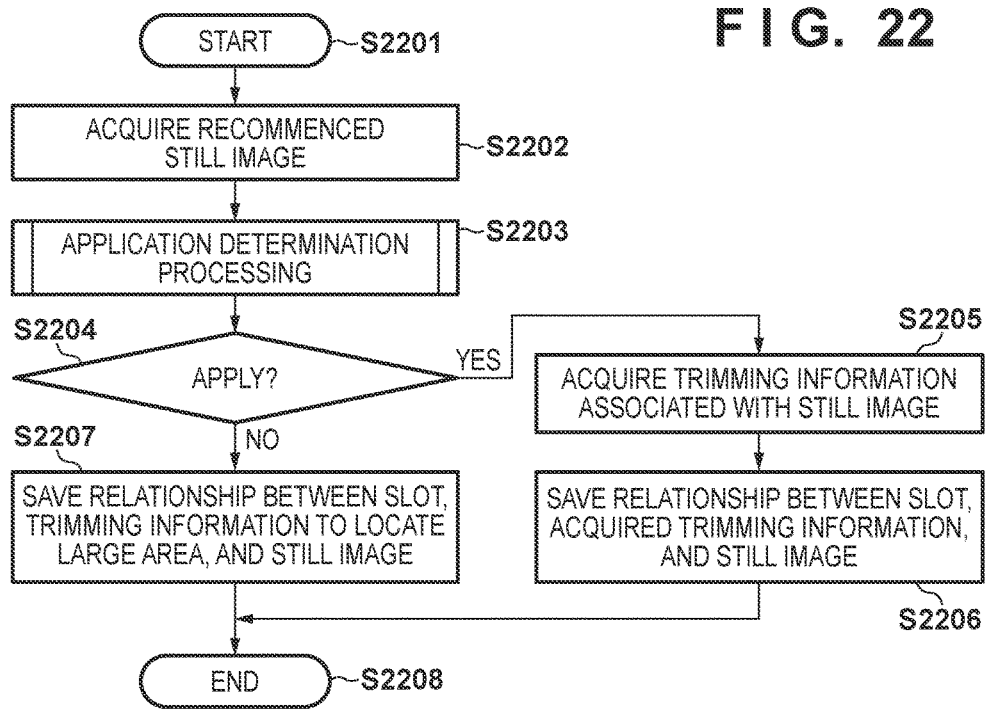
FIG. 22 is a flowchart showing an example of processing of selecting a still image to be located in a slot.

FIG. 22 is a flowchart showing an example of still image selection processing and trimming information application processing according to the second embodiment. A program associated with the flowchart of FIG. 22 is stored in the HDD 202, read out to a RAM 201, and executed by a CPU 204. When the user presses a still image selection button 426 shown in FIG. 4B, and selects a still image to be located in a slot, the CPU 204 executes the processing from step S2201 in accordance with the flowchart shown in FIG. 22.

In step S2202, the CPU 204 acquires whether the recommenced still image of a slot for which a still image is selected is person or landscape. As shown in FIG. 21, the CPU 204 saves and manages whether a recommenced still image is person or landscape. In step S2203, the CPU 204 executes application determination processing shown in FIG. 23 to be described later. Steps S2204 to S2208 of FIG. 22 are the same as steps S1604 to S1608 of FIG. 16, and a description thereof will be omitted.

Figure 23:
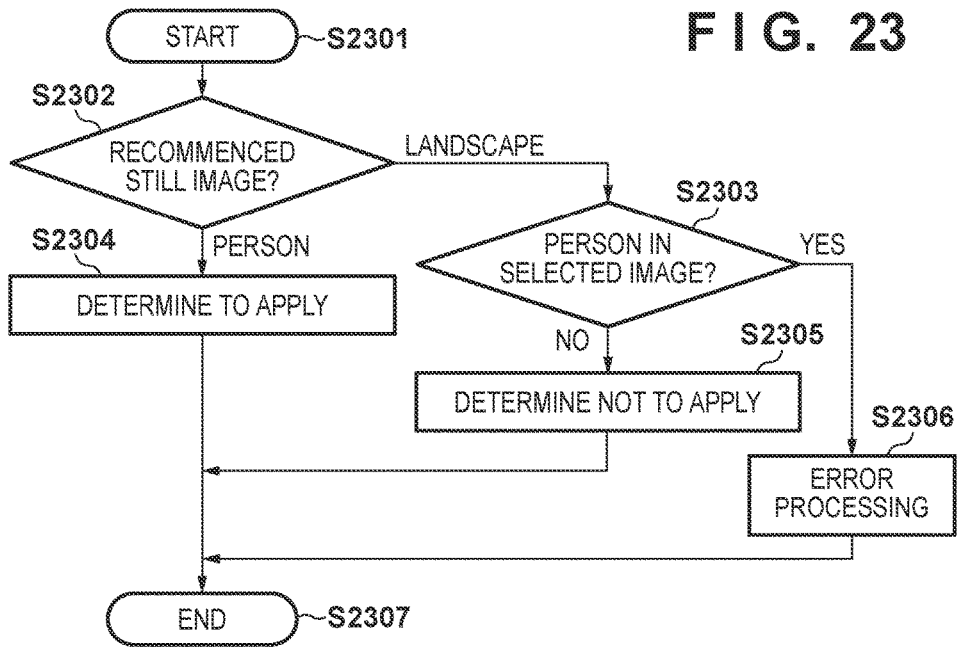
FIG. 23 is a flowchart showing an example of determining whether or not to apply trimming information based on the property of a slot.

A detailed example of the process of step S2203 in FIG. 22 will be described with reference to the flowchart of FIG. 23.

The CPU 204 starts processing of determining whether or not to apply trimming information from step S2301. In step S2302, the CPU 204 determines whether the recommenced still image set for the slot, which is acquired in step S2202 of FIG. 22, is person or landscape. If the recommenced still image is landscape, the process advances to step S2303. If the recommenced still image is person, the process advances to step S2304. In step S2304, the CPU 204 determines to apply trimming information for the slot of interest. On the other hand, when the process advances to step S2303, the CPU 204 determines whether a person face of a predetermined size or more exists in the still image represented by the still image file selected by the user. If a face of the predetermined size or more does not exist, the CPU 204 certifies the still image represented by the selected still image file as landscape, and determines not to apply trimming information in step S2305. On the other hand, if a face of the predetermined size or more is recognized in the image represented by the selected still image file, the process advances to step S2306. In this case, the user is going to paste a person face image in the slot having the property of landscape. In step S2306, the CPU 204 performs error processing (message display processing or processing of disabling the paste of the selected still image file) to indicate that the operation is disabled. The CPU 204 then ends the processing in step S2307, and returns to the invocation source of the processing. Note that when the error processing of step S2306 is executed, the process returns to step S2202 of FIG. 22 to perform the still image file selection operation again.

As described above, according to the second embodiment, if a still image recommended by the property of a slot is person (non-landscape), trimming information is performed by applying trimming information, and the image after the trimming is located in the slot. On the other hand, if a still image recommended by the property of a slot is landscape, the trimming information of the still image to be assigned to the slot is not applied (without trimming), and the image is located in the slot. This enables appropriate display to the user. Note that in the second embodiment, the recommenced still image is person or landscape. However, the embodiment is not limited to this, and an object such as an animal other than a person and landscape may be used.

The first and second embodiments of the present invention have been described above. In the above-described embodiments, the photo album creation application 80 as shown in FIG. 4 has been described as an example of an application. However, the present invention is not limited to this example, and can be implemented and enabled by an arbitrary application having the same image extraction function.

In the above-described embodiments, a personal computer is assumed as the information processing apparatus. However, the present invention is not limited to this example. The present invention is also effective in a device (terminal) usable in the same way, for example, a portable telephone, a personal digital assistant, a digital still camera, a digital video camera, a portable music player, a game machine, a set top box, or an Internet home appliance.

In the above-described embodiments, an OS equivalent to Windows® 8 is used as an example of an OS. However, the present invention is not limited to this OS, and an arbitrary OS can be used.

In the above-described embodiments, Ethernet is used as a configuration example of the network 4. However, the present invention is not limited to this OS, and any other arbitrary network configuration such as a wireless LAN, IEEE 1394, or Bluetooth may be used.

According to the above-described embodiments, it is possible to automatically switch, according to the property of a slot, whether or not to apply saved trimming information, thereby automatically performing optimum display to the user.

In the first embodiment, determination processing has been exemplified in which whether a slot is background or not is used as the property of a slot, if the property of a slot is not background, trimming information is applied, and if the property of a slot is background, trimming information is not applied. In the second embodiment, determination processing has been exemplified in which whether a recommenced still image is person or landscape is used as the property of a slot, if the recommenced still image is person, trimming information is applied, and if the recommenced still image is landscape, trimming information is not applied. However, the present invention is not limited to these examples, and can be implemented using an arbitrary processing method capable of achieving the same object. For example, the size, shape, aspect ratio, color, position, angle, or the like of a slot is employed as the property of a slot, and whether or not to apply trimming information may be determined based on the property. Whether or not to apply trimming information may be determined based on a combination of the properties. When a plurality of processing methods are combined, it is possible to more accurately provide appropriate display to the user.

An example in which Point (basing point), Width (width), Height (height), and Rotation (rotation angle) are used as elements of trimming information of an image has been described. However, the present invention is not limited to this example. The present invention can be implemented using an arbitrary analysis means capable of achieving the same object by, for example, including general image processing such as automatic photo correction and red eye correction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157509, filed Aug. 7, 2015, which is hereby incorporated by reference herein in its entirety.

What is claimed is:

1. An information processing apparatus for creating an electronic photo album from a plurality of images, the apparatus comprising:
    at least one processor which executes a program,
    wherein the at least one processor functions as units comprising:
    (1) a setting unit configured to set trimming information for an image, in accordance with an instruction by a user; and
    (2) a laying out unit configured to locate the image, such that a part of the image is represented in a slot of a template representing a position and a size of at least one slot in a page of interest,
    wherein when a slot of interest is a background slot, based on a determination in accordance with (i) an area of the slot of interest and (ii) another slot being located on the slot of interest, the at least one processor locates the image such that a first part of the image is represented in the background slot with a size corresponding to a size of the background slot, the first part of the image becoming smaller based on a shape of the background slot and not based on the trimming information set by the setting unit, and
    wherein when the slot of interest is not the background slot, the at least one processor locates the image such that a second part of the image is represented in the slot of interest with a size corresponding to a size of the slot of interest, the second part of the image becoming smaller based on both of a shape of the slot of interest and the trimming information set by the setting unit.

2. The apparatus according to claim 1, wherein a background image located on the background slot is partially hidden by another image.

3. The apparatus according to claim 2, wherein the background slot is a slot having a size of not less than a preset ratio with respect to an area of one page.

4. The apparatus according to claim 1, wherein the background slot is a slot configured to locate an image representing a landscape scene.

5. The apparatus according to claim 4, wherein the at least one processor further functions as a recognizing unit configured to detect whether a person face of not less than a predetermined size is included in the image, and
wherein the laying out unit locates the image in the slot of interest when the slot of interest is a slot having a property to locate the image representing the landscape scene, and the recognizing unit does not detect the person face in the image to be located in the slot of interest.

6. The apparatus according to claim 1, wherein when locating the image, the laying out unit trims the part of the image, and locates the part of the image obtained by the trimming in the slot of interest.

7. The apparatus according to claim 1, wherein the at least one processor further determines to use the trimming information set by the setting unit, in addition to the shape of the slot of interest, for specifying the part of the image to be represented in the slot of interest, in a case where the slot of interest in the page of interest is the background slot.

8. The apparatus according to claim 1, wherein the trimming information comprises width information and height information.

9. A method, performed by at least one processor which executes a program, of controlling an information processing apparatus for creating an electronic photo album from a plurality of image, the method comprising:
setting trimming information for an image, in accordance with an instruction by a user; and
performing layout processing of laying out the image, such that a part of the image is represented in a slot of a template representing a position and a size of at least one slot in a page of interest,
wherein when a slot of interest is a background slot, based on a determination in accordance with (i) an area of the slot of interest and (ii) another slot being located on the slot of interest, the image is located such that a first part of the image is represented in the background slot with a size corresponding to a size of the background slot, the first part of the image becoming smaller based on a shape of the background slot and not based on the trimming information set in the setting, and
wherein when the slot of interest is not the background slot, the image is located such that a second part of the image is represented in the slot of interest with a size corresponding to a size of the slot of interest, the second part of the image becoming smaller based on both of a shape of the slot of interest and the trimming information set in the setting.

10. The method according to claim 9, wherein a background image located on the background slot is partially hidden by another image.

11. The method according to claim 10, wherein the background slot is a slot having a size of not less than a preset ratio with respect to an area of one page.

12. The method according to claim 9, wherein the background slot is a slot configured to locate an image representing a landscape scene.

13. The method according to claim 12, further comprising performing recognition to detect whether a person face of not less than a predetermined size is included in the image,
wherein in the layout processing, the image is located in the slot of interest when the slot of interest is a slot having a property to locate the image representing the landscape scene, and the person face is not detected by the recognition in the image to be located in the slot of interest.

14. The method according to claim 9, wherein in the layout processing, when locating the partial image, the part of the image is trimmed, and the part of the image obtained by the trimming is located in the slot of interest.

15. A non-transitory computer-readable storage medium storing a program which causes at least one processor to execute a method of controlling an information processing apparatus for creating an electronic photo album from a plurality of image files, the method executed by the at least one processor comprising:
setting trimming information for an image, in accordance with an instruction by a user; and
performing layout processing of laying out the image, such that a part of the image is represented in a slot of a template representing a position and a size of at least one slot in a page of interest,
wherein, when a slot of interest is a background slot, based on a determination in accordance with (i) an area of the slot of interest and (ii) another slot being located on the slot of interest, the image is located such that a first part of the image is represented in the background slot with a size corresponding to a size of the background slot, the first part of the image becoming smaller based on a shape of the background slot and not based on the area trimming information set in the setting, and
wherein when the slot of interest is not the background slot, the image is located such that a second part of the image is represented in the slot of interest with a size corresponding to a size of the slot of interest, the second part of the image becoming smaller based on both of a shape of the slot of interest and the trimming information set in the setting.

16. The medium according to claim 15, wherein a background image located on the background slot is partially hidden by another image.

17. The medium according to claim 16, wherein the background slot is a slot having a size of not less than a preset ratio with respect to an area of one page.

18. The medium according to claim 15, wherein the background slot is a slot configured to locate an image representing a landscape scene.

19. The medium according to claim 18, further comprising performing recognition to detect whether a person face of not less than a predetermined size is included in the image,
wherein in the layout processing, the image is located in the slot of interest when the slot of interest is a slot having a property to locate the image representing the landscape scene, and the person face is not detected by the recognition in the image to be located in the slot of interest.

20. The medium according to claim 15, wherein in the layout processing, when locating the image, the part of the image is trimmed, and the part of the image obtained by the trimming is located in the slot of interest.

* * * * *